C. H. VAN NOSTRAND AND H. E. SCHULSE.
PROCESS FOR MAKING FIBROUS FILTERING FILMS.
APPLICATION FILED FEB. 8, 1918.
1,392,989.
Patented Oct. 11, 1921.
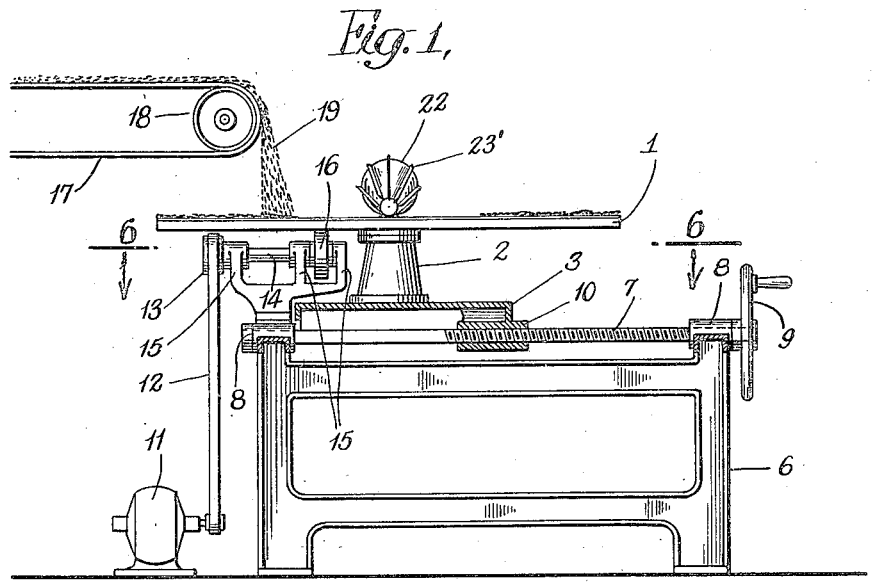
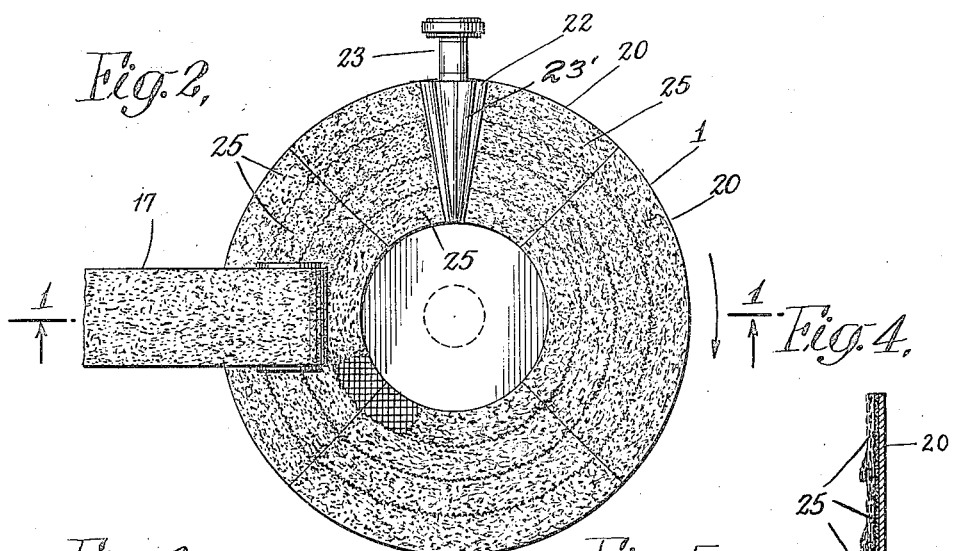
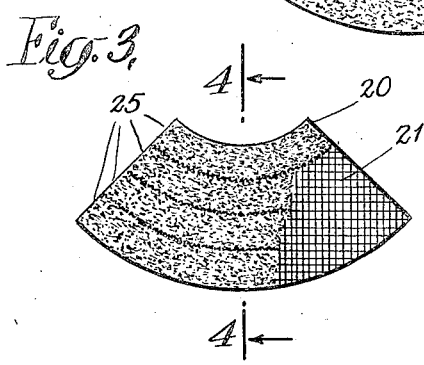
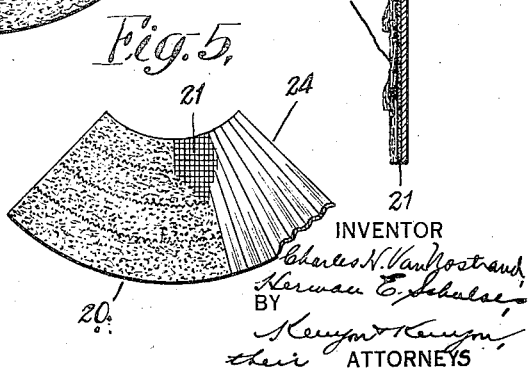

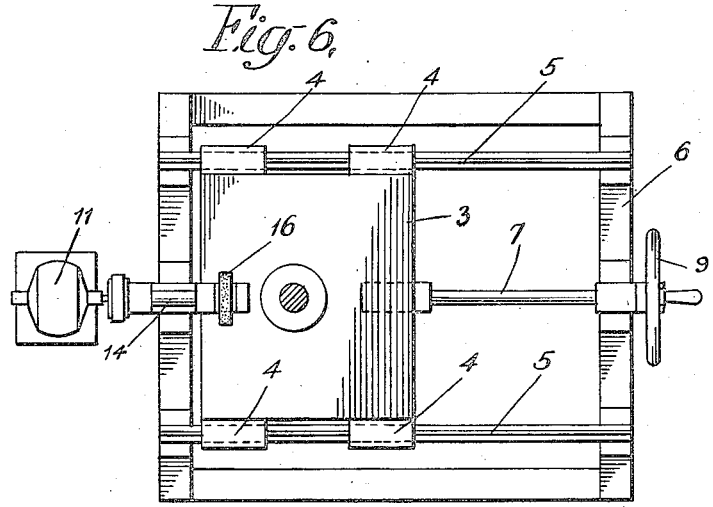
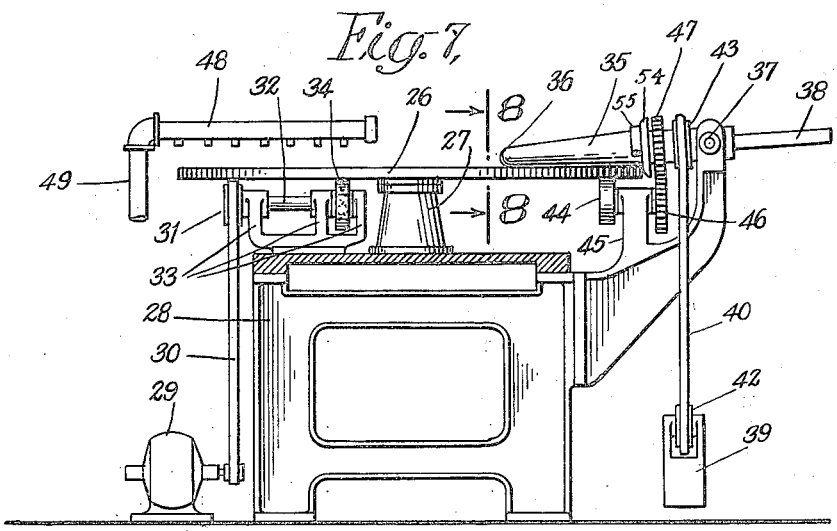
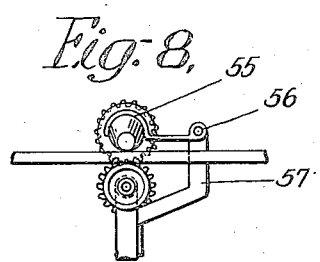

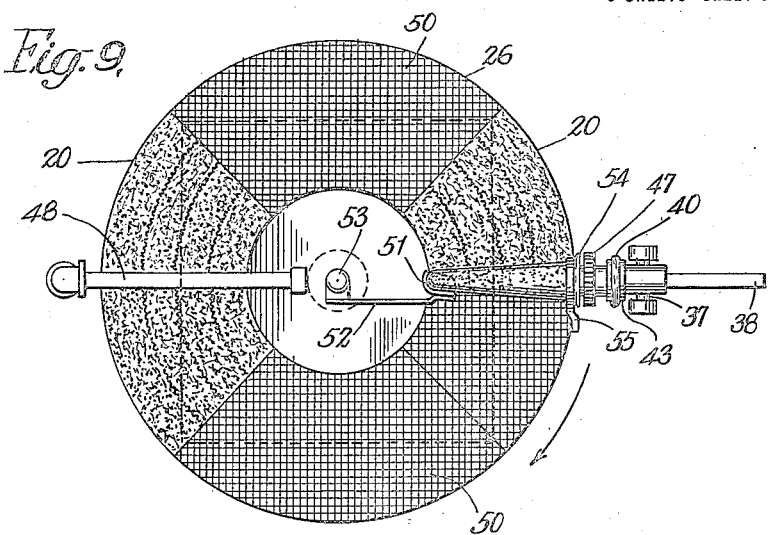
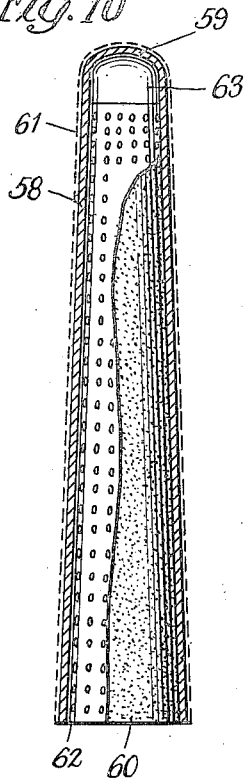
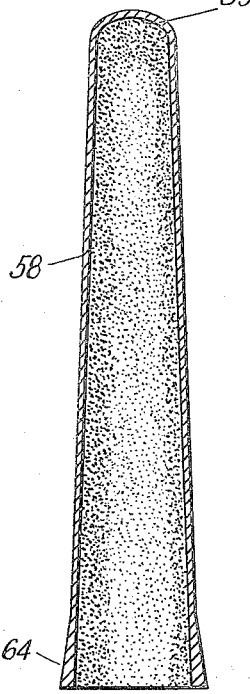
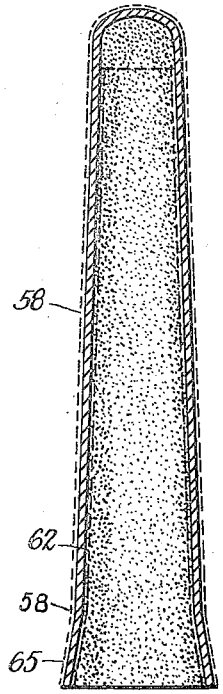
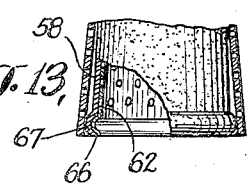

UNITED STATES PATENT OFFICE.

CHARLES H. VAN NOSTRAND, OF ORANGE, AND HERMAN E. SCHULSE, OF JERSEY CITY, NEW JERSEY; SAID SCHULSE ASSIGNOR TO SAID VAN NOSTRAND.

PROCESS FOR MAKING FIBROUS FILTERING-FILMS.

1,392,989.

Specification of Letters Patent.

Patented Oct. 11, 1921.

Application filed February 8, 1918. Serial No. 216,111.

*To all whom it may concern:*

Be it known that we, CHARLES H. VAN NOSTRAND and HERMAN E. SCHULSE, citizens of the United States, the former a resident of Orange, Essex county, State of New Jersey, and the latter a resident of Jersey City, Hudson county, State of New Jersey, have invented certain new and useful Improvements in Processes for Making Fibrous Filtering-Films, of which the following is a specification.

Our invention relates to processes for making filtering films made of fibrous filtering material. It has for its object to produce new and improved filtering films made of fibrous material, light in construction and suitable in shape to be removable and replaceable in connection with suitable supporting devices, and presenting a minimum of joints and clamping means at such joints, and giving relatively large and efficient filtering surface, and possessing other advantages herein recited; and our invention has also for its object to provide new and improved processes of making such filtering films of the general character above described, quickly, cheaply and efficiently.

It consists of the new and improved processes for making filtering films, herein shown and described.

Our improved process may be carried out on any suitable apparatus. In the accompanying drawings forming part of this specification we have shown apparatus suitable for carrying out our process in its preferred form, and we have also shown our improved filtering films in their preferred form.

Referring now to such drawings, Figure 1 is a side elevation, with parts in section on the line 1—1 of Fig. 2, of a revolving table and accompanying apparatus for making sheets from fibrous filtering material. Fig. 2 is a plan of the same. Fig. 3 is a plan of one of the sections or pans coated with fibrous material arranged in overlapping strips with part of the filtering material removed. Fig. 4 is a side view of the same to illustrate the overlapping strips, the strips being exaggerated in size for the purpose of clearness in illustration. Fig. 5 is a plan of a modified form of section or pan. Fig. 6 is a plan of the stationary support upon which the revolving table of Fig. 1 is placed. Fig. 7 is a front elevation of the forming table with the framework in section. Fig. 8 is a detail of the former and certain apparatus connected with it. Fig. 9 is a plan of the forming table. Figs. 10, 11, 12 and 13 are longitudinal sections through our improved film, Fig. 10 being also through the inner and outer perforated plates, Fig. 11 showing the film slightly thickened at its base, Fig. 12 showing the supporting perforated plates as inclined slightly outward at the base, and Fig. 13 showing a modified form of the base of the supporting plates.

In our improved process we first make a sheet or sheets of light fibrous filtering material of substantially the same thickness, texture and density generally throughout the sheet without matting the fibers, by spreading loose, light, fibrous filtering material on a suitable supporting surface or surfaces, and rolling it lightly in places or ridges to make the said sheet of the character described above, and we then bring such sheet or sheets, and a former of suitable material and of the shape of the film to be made into rolling contact with each other under pressure to cause the filtering material to be picked up by the former and formed into a film thereon of the same shape as the former, preferably moistening a sheet before bringing it into contact with the former, and then withdrawing the film from the former and repeating the operation.

Referring to the apparatus and the form of process shown and illustrated in the drawings, Figs. 1 to 6 inclusive illustrate the apparatus used in making the sheet of filtering material referred to above. 1 is a rotary table rotatably mounted on a standard 2 carried by a sliding block 3 having lugs 4, 4 running on guide rails 5, 5 secured to and forming part of stationary framework 6. 7 is a screw capable of rotating in bearings 8, 8 of the framework and carrying on its end an operating hand-wheel 9, by means of which the screw may be rotated. The screw passes through an internally screw-threaded sleeve 10 on block 3. By these means table 1 can be shifted as desired across the framework 6.

Table 1 may be rotated by any suitable means. Those shown consist of an electric motor 11 driving through belt 12, pulley 13, shaft 14 mounted in bearings in brackets 15, 15 of the framework. 16 is a friction wheel mounted on shaft 14 and bearing upon the 11 under side of table 1 and rotating it by frictional pressure.

17 is a feeding belt running over pulley 18 feeding or spreading a stream 19 of fibrous filtering material upon table 1. The fibrous filtering material may be spread directly upon the surface of table 1 if desired. In practice we prefer to place upon the table pans or sections 20, as shown in the form substantially of sectors of a circle. These pans may be made of any suitable material, such, for instance, as card-board or metal. In practice we prefer to cover them with a material such as woven cloth or paper as shown at 21, Fig. 3. 22 is a roller loosely rotating in a collar 23 secured to the framework. This roller is preferably provided with flutes or ribs 23. These ribs rest upon the loose fibrous material that has been fed upon the table, and as the table rotates, the roller rolls over the fibrous filtering material lightly, pressing it in places or ridges, smoothing and evening out the filtering material and making it into a sheet of substantially the same thickness and porosity throughout without unduly compressing the fibers. The roller and its ribs are shown as tapering in order to compensate for the difference in speed of the rotation of the table at different points along the radius of the table.

Fig. 5 shows a modified form of the pan or section in which the surface 24 is made corrugated.

The general operation of the apparatus in this first step of our process, illustrated in Figs. 1 to 6 inclusive, is as follows. Any suitable fibrous filtering material may be used. In practice we prefer to use a loose light filtering material such as asbestos. This is spread in any suitable way over the revolving table 1, either with or without the sections or pans 20. For convenience and speed of operation and efficiency, we prefer to use the pans, shaped as shown, and with the pans coated with suitable material such as woven cloth, paper, &c., adapted to receive and give up the fibrous filtering material readily to the former. The fibrous filtering material may be spread upon the table or pans by any suitable mechanism, and may be prepared in any suitable way. We have shown, simply for illustration, as one method, a feeding belt 17 spreading a shower of asbestos fiber upon the table. As the apparatus for picking or preparing the fibrous material and supplying it to the belt, form no part of the invention, we have not illustrated it. We prefer to spread the fibrous filtering material in strips that will overlap one another along their edges. As shown in the drawings, these strips form concentric rings 25. This is accomplished in the apparatus shown by shifting the position of the table 1 along screw 7 of the framework. In this way the outer concentric ring 25 is first fed, then the table is moved to the left, as shown in Figs. 1 and 2, and the second concentric ring is spread upon the pan sections on the table, and preferably the outer edge of this concentric ring extends slightly over the inner end of the outermost concentric ring, and so on, with each inner concentric ring extending slightly over the inner edge of the next outer concentric ring, as clearly shown in Fig. 4. This overlapping, and the thickness of the film, are exaggerated in Fig. 4 (which represents a sheet unrolled) simply for purposes of illustration and clearness. Of course it will be understood that in making these concentric rings with overlapping edges, it is not essential that the table should be the movable element. It is only essential that either one or the other of the two elements, the table and the feed, should be shifted relatively one to the other; nor is it essential that the outer concentric rings be spread first.

We have found that if the fibrous filtering material is spread in the shape of strips or concentric rings and preferably overlapping at their edges, a stronger sheet is obtained and one more likely to be of even texture and density throughout its area generally than if the fibrous filtering material be spread over the table in another way. The overlapping of the edges of adjacent strips or rings tends also to strengthen the finished film and prevent the presence of thin spots in the film. It is of course highly important that a filtering film of the character shown and described, should not have spots or areas where the film is substantially thinner than at other points. The presence of thin spots decreases the efficiency of the film as a filtering medium, and tends to more speedy disruption of the film and a shorter life.

As the fibrous filtering material is being fed upon the table 1 in concentric rings, it is lightly pressed down by the fluted roller 22. This roller presses upon the filtering material simply along its ribs or flutes 23. It thus presses only in spots or places or lines. In practice we prefer to run the table so that the fibrous filtering material will be fed and passed under the fluted roller a number of times for each concentric ring, so that the lines of pressure will very fully cover its surface. The result is that the filtering material is spread evenly and lightly into a laminated sheet that is of substantially the same thickness, and porosity throughout, and this is done without unduly compressing the fibers together. We have found that where the fibers are not evened off after the feeding or where they are pressed together with considerable force, the films are apt to be irregular or not porous enough or of uneven porosity in different parts of their surface.

By using sectional pans we are enabled to make the sheet in suitable sizes so that the sheet on each section or pan is of just the proper size to make a single film. By the use of such sections on the spreading table we are also enabled to readily remove the pans to the forming table illustrated in Figs. 7—9, thus expediting and cheapening the process.

In Figs. 7—9 we have illustrated the apparatus used in the second or film-forming step of our operation. In this apparatus 26 is a revolving table mounted and revolving in the standard 27 fast on framework 28. The table, as shown, is driven by electric motor 29 through belt 30, pulley 31, shaft 32 mounted in bearings 33 carried by framework 28; and through friction wheel 34 fast on shaft 32. Wheel 34 bears on the under surface of table 26 and rotates it.

35 is the former. It is made of the same shape as that desired in the finished film. As shown, it is slightly tapering, and turned up or rounded at the apex 36. The former may be made of any suitable material. We have found that a metal former coated with cloth or paper gives admirable results. The surface must not be too adhesive to prevent the removal of the film therefrom, but at the same time it must be sufficiently adhesive to pick up the sheet of fibrous material from the table or pans. The former is pivoted at 37 to the framework, and is provided with a handle 38, by means of which it may be tipped up and away from the table. 39 is a weight pressing former 35 downward by means of a belt 40 which runs over pulley 42 loose on the weight and pulley 43 on the former. The weight gives the necessary pressure to the former to cause it to pick up the sheet and to compress the sheet between the former and the surface of the table, as hereinafter described, to make the film sufficiently dense, smooth and hard.

Former 35 is rotated by means of a friction wheel 44 mounted on a short shaft carried in bearings in bracket 45 of the framework, the shaft carrying at its other end a gear 46 meshing with a gearing 47 fast on former 35. By these means the former is rotated in the same direction as the table and at a somewhat greater speed in order to assist in picking up the sheet from the pan.

We prefer in practice to moisten the sheet of fibrous material before it is operated upon by the former. For this purpose we provide a spraying device 48 connected by pipe 49 with some suitable supply of water or steam.

The operation of the second or forming step is as follows. The sections or pans are taken from table 1 and placed upon forming table 26. They may be placed upon it in any suitable way. We prefer to place the pans with intervening sections of table 26 without any pans. Table 26 is preferably covered with a suitable coating such as cloth or paper. In Fig. 9 we have shown two of the pans 20 with intervening spaces 50, 50 with the cloth exposed. After the pans are placed in operation the table is revolved and the former picks up the sheet on the first pan and rolls it into a laminated film of the same shape as the former, and as shown in Fig. 10. The finished film is slightly tapering. We prefer to form the apex closed, leaving only one opening in the film, namely, at the bottom. For this purpose we provide at the apex of the former a compressing spoon 51 with a hollowed out or spoon surface, and pressing against the rounded apex of the former. This rounded spoon forces the fibrous sheet up and around the apex of the former and compresses it around the apex to form a closed rounded apex for the film, strong and durable. Spoon 51 is carried on a spring arm 52 secured to the central axis 53 of the table.

In order to form a clear, sharply defined edge at the bottom of the film we arrange a curved collar 54 at the base of former 35, and a coöperating curved finger 55 pivoted at 56 to a bracket 57 from the framework. The collar and finger coöperate to press the sheet to form a clearcut lower edge. Finger 55 is loosely pivoted at 56 so that it may be lifted out of the way when it is desired to tip the former 35 up from the table. After rolling a sheet of one pan section 20 on to the former to form a film, we preferably continue the rotation of the table so that the film on the former is compressed between the former and the woven cloth section 50 of the table. This compresses the film still further to make it harder, stronger, denser and with a more polished or finished surface. When the end of section 50 is reached the table is stopped, and the former tipped up, when the film can be easily slipped off from the former. The film is now complete and ready for use. The former is tipped down again and the table started rotating, repeating the operation. When the second film has been formed and rolled over the succeeding cloth section 50, the table is again stopped, the former lifted, and the film removed. The empty pans are then removed and two other pans from table 1 are placed in position, and so on. By using rotating tables and in pairs, as shown, one a table to make the sectors of sheet fibrous material, and the other to receive the sheet sectors and form them into films, the films may be made very quickly, rapidly, cheaply and efficiently.

In Figs. 10 to 13 we have illustrated the finished films. 58 represents a finished film. As shown, it is slightly tapering with apex 59 rounded and closed and having only one opening, namely, at the base 60. The films are of substantially even thickness, texture, and density throughout, and are free from thin or weak spots. Our improved films are easily and cheaply transportable, nesting into one another, either so that many can be packed into a small space, or even in certain instances the films can be flattened out for purposes of packing and transportation without substantial injury to their subsequent operation when restored to conical form.

Our improved films are particularly serviceable for use in connection with perforated inner and outer supports of substantially the same shape. 61 illustrates an outer perforated support and 62 an inner perforated support. The latter is preferably provided with an imperforate rounded apex 63. Our improved films are easily put in position in such supports and can be easily placed in filtering chambers, there being only one joint to be clamped, namely, at the opening of the filtering supports and films. At the apex there is no joint due to the imperforate cap or apex of the inner support, and to the closed or rounded top of the film 59 itself. The slightly tapering shape of the film, and its supports, enables a tight joint to be made at the bottom between them by merely slipping one over the other.

In Fig. 11 we have shown a film preferably thickened toward its base as shown at 64. This is obtained by simply feeding a little more of the fibrous material in at the outer section or ring of the sheet on table 1. In Fig. 12 we have shown the perforated supports 58 and 62 as slightly inclined outward toward the bottom as illustrated at 65. This is to further assist in tightening the joint at that part. In Fig. 13 we have shown the inner perforated support 62 as provided with a bead at 66. The film 58 at its base is compressed between the bead and the outer support.

It will be noted that in each change of relative position of table 1 to pulley 16 while the table as a whole is being rotated faster in some positions than in others, the same surface speed in spreading any particular concentric ring is maintained as that maintained in spreading each other concentric ring.

The apparatus shown in the drawings and described above, and the product of our improved process are not claimed in this application, but are made the subjects, respectively, of another application executed simultaneously herewith, Serial No. 216,110, filed February 8, 1918, and an application Serial No. 236,995 filed May 28, 1918, which latter application is a division of the present one.

We prefer to make the arc length of the sheet on a pan several times longer than the rolling circumference of the former, so that the film built up on the former will be composed of a number of laminations.

It will be understood of course that other apparatus than that we have shown may be used for carrying out our improved process, and that many changes or modifications in the steps may be made, and in the films themselves, without departing from our invention, the essentials of which are set forth in the appended claims.

What we claim as new and desire to secure by Letters Patent is:

1. The process of making filtering films which consists in spreading loose, fibrous, filtering material evenly over a suitable supporting surface, rolling the same lightly in places to make a sheet thereof of substantially the same porosity throughout, bringing the sheet thus formed and a former, of the shape of the film to be made, into rolling contact under pressure to cause the filtering material to be picked up by the former and formed thereon into a film of the same shape as the former, and withdrawing the film from the former, whereby fibrous filtering films may be formed of the desired shape and of substantially the same porosity throughout.

2. The process of making filtering films which consists in spreading loose, fibrous, filtering material evenly over a suitable supporting surface, rolling the same lightly with pressure applied along lines only to make the sheet thereof of substantially the same porosity throughout, bring the sheet thus formed and a former, of the shape of the film to be made, into rolling contact under pressure to cause the filtering material to be picked up by the former and formed thereon into a film of the same shape as the former, and withdrawing the film from the former, whereby fibrous filtering films may be formed of the desired shape and of substantially the same porosity throughout.

3. The process of making filtering films which consists in spreading loose, fibrous, filtering material evenly over a suitable supporting surface in strips overlapping one another along their edges, rolling the same lightly in places to make a sheet thereof of substantially the same porosity throughout, bringing the sheet thus formed and a former, of the shape of the film to be made, into rolling contact under pressure to cause the filtering material to be picked up by the former and formed thereon into a film of the same shape as the former, and withdrawing the film from the former, whereby fibrous filtering films may be formed of the desired shape and of substantially even porosity throughout.

4. The process of making filtering films which consists in spreading loose, fibrous, filtering material evenly over a suitable rotary supporting surface in concentric rings overlapping one another along their edges, rolling the same lightly in places to make a sheet thereof of substantially the same porosity throughout, bringing the sheet thus formed, and a former, of the shape of the film to be made, into rolling contact under pressure to cause the filtering material to be picked up by the former and formed thereon into a film of the same shape as the former and withdrawing the film from the former, whereby fibrous filtering films may be formed of the desired shape and of substantially even porosity throughout.

5. The process of making filtering films which consists in spreading loose, fibrous, filtering material evenly over a suitable rotary supporting surface in concentric rings overlapping one another along their edges, rolling the same lightly with pressure applied along lines only to make a sheet thereof of substantially the same porosity throughout, bringing the sheet thus formed and a former, of the shape of the film to be made, into rolling contact under pressure to cause the filtering material to be picked up by the former and formed thereon into a film of the same shape as the former, and withdrawing the film from the former, whereby fibrous filtering films may be formed of the desired shape and of substantially even porosity throughout.

6. The process of making filtering films which consists in spreading loose, fibrous, filtering material evenly upon separate and removable suitable supporting sections, rolling each section lightly in places to make a sheet thereof of the shape of the section and of substantially the same porosity throughout, bringing each sectional sheet thus formed and a former, of the shape of the film to be made, into rolling contact under pressure to cause the filtering material of the sectional sheet to be picked up by the former and formed thereon into a film of the same shape as the former, and withdrawing the film from the former, whereby fibrous filtering films may be formed of the desired shape and of substantially even porosity throughout.

7. The process of making filtering films which consists in spreading loose, fibrous, filtering material evenly upon separate and removable suitable supporting sections with intervening supporting sections having a suitable non-adhesive surface without any filtering material thereon, rolling each coated section lightly in places to make a sheet thereof of the shape of the section and of substantially the same porosity throughout, bringing each sheet and its adjacent uncoated section and a former, of the shape of the film to be made, into rolling contact under pressure to cause the filtering material of the coated section to be picked up by the former and formed thereon into a film of the same shape as the former, rolling the film on said former over the adjacent uncoated section, and withdrawing the film from the former, whereby fibrous filtering films may be formed of the desired shape and of substantially even porosity throughout.

8. The process of making filtering films which consists in spreading loose fibrous filtering material evenly upon separate and removable suitable supporting sections in strips overlapping one another along their edges, rolling each section lightly in places to make a sheet thereof of the shape of the section and of substantially the same porosity throughout, bringing each sectional sheet thus formed and a former, of the shape of the film to be made, into rolling contact under pressure to cause the filtering material of the sectional sheet to be picked up by the former and formed thereon into a film of the same shape as the former, and withdrawing the film from the former, whereby fibrous filtering films may be formed of the desired shape and of substantially even porosity throughout.

9. The process of making filtering films which consists in spreading loose fibrous filtering material evenly in concentric rings upon separate and removable rotary suitable supporting sectors in strips overlapping one another along their edges, with a rotary supporting sector having a suitable non-adhesive surface but without any filtering material placed thereon adjacent to each supporting sector coated with filtering material, rolling the coated sectors lightly in places to make a sheet thereon of the shape of the sector and of substantially the same porosity throughout, bringing each coated sector and its adjacent uncoated sector and a former of the shape of the film to be made, into rolling contact under pressure to cause the filtering material on the coated sector to be picked up by the former and formed thereon into a film of the same shape as the former, rolling the film thus formed on the said former and the former, over the adjacent uncoated sector and withdrawing the film from the former, whereby fibrous filtering films may be formed of the desired shape and of substantially even porosity throughout.

10. The process of making filtering films which consists in spreading loose, fibrous filtering material evenly over a suitable supporting surface, rolling the same lightly in places to make a sheet thereof of substantially the same porosity throughout bringing the sheet and a former of tapering shape and with a rounded apex into rolling contact under pressure to cause the filtering material of the sheet to be picked up by the former and formed thereon into a film of tapering form, turning up and compressing the sheet around the rounded apex of the former to form a film with a closed end at its apex, and withdrawing the film from the former, whereby fibrous filtering films may be formed tapering in form and closed at one end and of substantially even porosity throughout.

11. The process of making filtering films which consists in spreading loose, fibrous filtering material evenly over a suitable supporting surface, rolling the same lightly in places to make a sheet thereof of substantially the same porosity throughout, bringing the sheet thus formed and a former, of the shape of the film to be made, into rolling contact under pressure to cause the filtering material to be picked up by the former and formed thereon into a film of the same shape as the former, compressing the sheet against the lower edge of the former to form a strong, cleancut lower edge to the film, and withdrawing the film from the former, whereby fibrous filtering films may be formed of the desired shape and of substantially even porosity throughout.

12. The process of making filtering films which consists in spreading loose, fibrous filtering material evenly over a suitable supporting surface, rolling the same lightly in places to make a sheet thereof of substantially the same porosity throughout, moistening the sheet and former, bringing the sheet thus formed and a former of the shape of the film to be made, into rolling contact under pressure to cause the filtering material to be picked up by the former and formed thereon into a film of the same shape as the former, and withdrawing the film from the former, whereby fibrous filtering films may be formed of the desired shape and of substantially even porosity throughout.

13. A method of producing sheets from loose fibrous filtering material adapted to be used in making filtering films, which consists in spreading loose fibrous filtering material on a suitable surface in overlapping strips, and lightly pressing upon said strips in numerous places or lines to make a sheet of substantially equal porosity throughout.

14. A method of producing sheets from loose fibrous filtering material adapted to be used in making filtering films which consists in spreading loose fibrous filtering material on a suitable rotary surface in ring or arc sections overlapping each other, and lightly pressing in numerous places or lines upon said ring sections to make a filtering sheet of substantially equal porosity throughout.

15. The process of making fibrous films with a corrugated surface which consists in forming corrugated sheets of filtering material, moistening the sheets, and bringing them into rolling contact under pressure with a former of the shape of the film desired.

16. The process of making tapering filtering films with a closed apex which consists in forming sheets of filtering material of even porosity throughout, bringing such sheets into rolling contact under pressure with a tapering former rounded at one end, and compressing filtering material against such rounded end.

17. The process of making tapering filtering films of substantially even porosity throughout which consists in feeding loose fibrous filtering material upon removable pans of a sector-like form carried upon a rotary table, lightly pressing the filtering material in lines or places, removing the pans to another rotary table, moistening the sheets of filtering material, and bringing them into rolling contact under pressure with a former of the shape of the films to be made.

In testimony whereof, we have signed our names to this specification.

CHARLES H. VAN NOSTRAND.
HERMAN E. SCHULSE.